United States Patent [19]

Schotz

[11] Patent Number: 4,734,897
[45] Date of Patent: Mar. 29, 1988

[54] CASSETTE ADAPTER FOR PLAYBACK DEVICE, SUCH AS A COMPACT DISK PLAYER

[75] Inventor: Larry Schotz, Cedarburg, Wis.

[73] Assignee: Recoton Corporation, Long Island City, N.Y.

[21] Appl. No.: 890,355

[22] Filed: Jul. 25, 1986

Related U.S. Application Data

[63] Continuation-in-part of Ser. No. 797,706, Nov. 13, 1985, abandoned.

[51] Int. Cl.⁴ .............................................. H04B 1/20
[52] U.S. Cl. ........................................ 369/2; 369/289; 360/137; 174/65 R; 381/86
[58] Field of Search ..................... 369/2, 9, 10, 11, 12, 369/1, 5, 289; 174/65 R, 154; 360/137; 381/86

[56] References Cited

U.S. PATENT DOCUMENTS

| | | |
|---|---|---|
| 3,483,309 | 12/1969 | Kerseg et al. ................. 174/65 R |
| 3,582,965 | 6/1971 | DeMetrick . |
| 3,612,776 | 10/1971 | Ban . |
| 3,619,515 | 11/1971 | Lace . |
| 3,624,310 | 11/1971 | Mathey . |
| 3,644,684 | 2/1972 | Tsuji . |
| 3,662,123 | 5/1972 | Huber . |
| 3,700,826 | 10/1972 | O'Neal . |
| 3,946,156 | 5/1976 | Budrose . |
| 3,978,524 | 8/1976 | Gordon . |
| 4,034,164 | 7/1977 | Westmoland . |
| 4,228,474 | 10/1980 | Neal . |

Primary Examiner—Raymond F. Cardillo
Assistant Examiner—Hoa T. Nguyen
Attorney, Agent, or Firm—Curtis, Morris & Safford

[57] ABSTRACT

An adapter for enabling the signals produced by one type of playback device, such as a compact disc player, to be reproduced as audio sounds by a cassette player audio system, the latter having a conventional cassette playback deck. The adapter is comprised of a housing having a configuration substantially identical to the configuration of a cassette normally used with the playback deck. The adapter housing has at least one opening to receive the usual reel-drive spindle of the playback deck; and a record head is supported in the housing in a position for contacting the usual playback head of the deck when the adapter is received, or loaded into that deck. The adapter is connected to the playback device (e.g. the compact disc player) by a plug connected to the usual headphone jack of the player, whereby signals produced by the player are supplied to the record head from which they are coupled to the playback head of the cassette deck for reproduction by the audio system.

19 Claims, 9 Drawing Figures

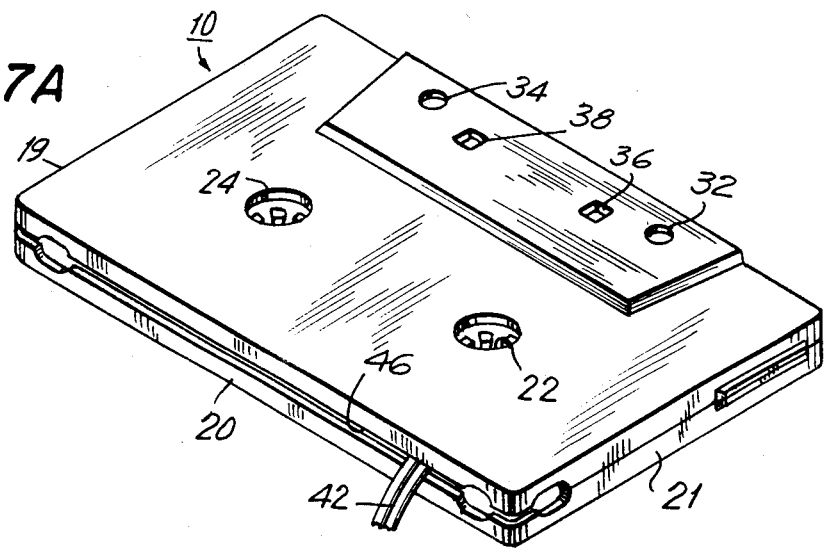
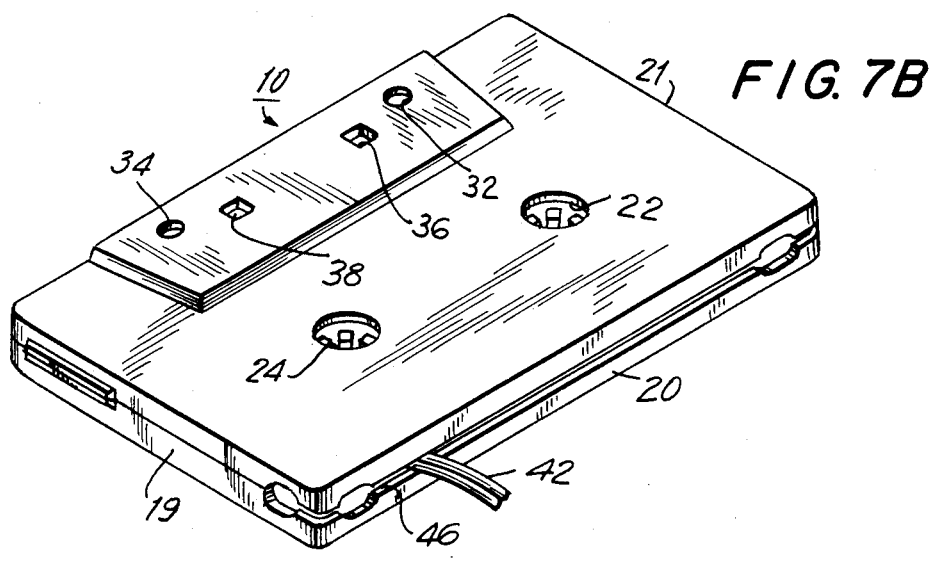
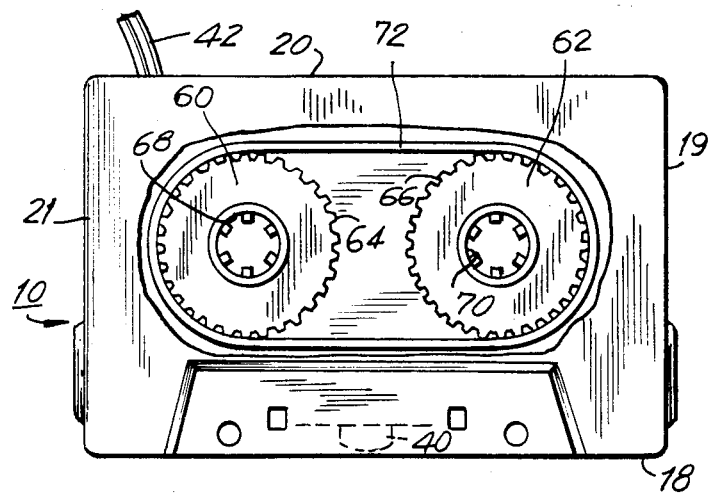

CASSETTE ADAPTER FOR PLAYBACK DEVICE, SUCH AS A COMPACT DISK PLAYER

This is a continuation-in-part of application Ser. No. 797,706, filed Nov. 13, 1985 now abandoned.

BACKGROUND OF THE INVENTION

This invention relates to an adapter and, more particularly, to an adapter for use with a conventional cassette playback deck to enable that deck to reproduce signals produced by another device (such as, but not limited to, a compact disc player).

Recently, new formats have become available for high fidelity sound reproduction. One type of format is the compact disc system. A typical compact disc player includes a laser light beam which scans a rotating disc having audio signals recorded thereon in the form of "pits" and "lands" disposed in concentric, circular tracks. The sensing of these signals by a light beam obviates any contact between a pickup stylus and the "pits" and "lands", thereby avoiding deterioration of the quality of the recorded signals even when the disc is played several times. Such compact discs and compact disc players thus are a significant improvement over conventional phonograph records and phonograph players in which a stylus rides in a spiral track and undergoes vibratory movement as a function of the signals that are etched into the so-called sound groove. The compact disc player and the disc used therewith are of significantly smaller size than conventional phonograph players and phonograph records and, thus, have been designated by the industry as "compact discs" and "compact disc players".

Prior to the introduction of the aforementioned compact disc and player, sound systems, such as those provided in automobiles, generally have utilized cassettes and so-called eight-track cartridges as the source from which audio signals are played back. Cassettes and cartridges both utilize magnetic tape on which high fidelity selections have been recorded. The sound systems with which such cassettes and cartridges are compatible include a playback deck that receives the cassette or cartridge, reproduces the signals that had been recorded on the magnetic tape therein and converts those signals to audible sounds. Significant investments have been made by consumers to provide high quality sound systems in their automobiles and elsewhere for the purpose of enjoying prerecorded cassettes and cartridges.

With the advent of the compact disc, it is expected that sound systems for use in automobiles will be provided with compact disc players so that a consumer may listen to the same compact discs in his automobile that he enjoys in his home. At the present time, some manufacturers manufacture portable compact disc players. However, automobile sound systems utilizing such compact disc players are not readily available at the present time. Thus, when a portable compact disc player is used in an automobile, the existing sound system of that automobile, which generally is quite expensive and offers high fidelity sound reproduction, cannot be enjoyed. Rather, it is necessary to utilize conventional headphones, which are connected to the compact disc player by means of a suitable plug and headphone jack, to appreciate the compact disc sound reproduction. The danger of a driver relying on headphones when operating his vehicle is self-evident.

Furthermore, it is apparent that a consumer who owns a compact disc player yet has a cassette player audio system in his automobile must purchase dual libraries to appreciate both systems. That is, the consumer must purchase a library of compact discs for use with his compact disc player as well as a library of cassettes or cartridges for use with his cassette (or cartridge) player audio system. The disadvantage and expense of such dual libraries can be readily appreciated.

Still further, it might be desirable to utilize the quality of the audio system which incorporates a cassette player to reproduce the sounds generated by other devices, such as the sound channel of a television receiver, or the sounds produced by shortwave radios, CB systems, etc. If such other devices include a simple headphone jack, the present invention facilitates such use.

OBJECTS OF THE INVENTION

Therefore, it is an object of the present invention to provide an adapter by which a cassette (or cartridge) player audio system provided in, for example, an automobile, can be used with another sound producing device such that the signals produced by that other device nevertheless can be reproduced by the cassette audio system.

Another object of this invention is to provide an adapter for use in a cassette player audio system in, for example, an automobile, whereby the need heretofore to provide dual libraries, as aforesaid, is obviated.

Another object of this invention is to provide a relatively inexpensive adapter by which a cassette player audio system may be "transformed" for use with another format.

A still further object of this invention is to provide an adapter by which a compact disc player (or other playback device of different format) and a cassette player are made compatible without requiring rewiring or reconstruction of the audio system in which the cassette player is a part.

Various other objects, advantages and features of the present invention will become readily apparent from the ensuing detailed description, and the novel features will be particularly pointed out in the appended claims.

SUMMARY OF THE INVENTION

In accordance with this invention, an adapter is provided for enabling the signals produced by another sound producing device, such as a compact disc player, to be reproduced as audio sounds by a cassette player audio system of the type having a cassette playback deck. The adapter includes a housing of a configuration that is substantially identical to the configuration of a cassette normally used with the playback deck. As used herein, the expression "cassette" is intended to refer to conventional reel-to-reel magnetic tape cassettes, such as the so-called "standard" or "Philips" type cassette or the so-called "micro" cassette. The expression "cassette" also is intended to refer to the so-called eight-track cartridge known to those of ordinary skill in the art.

The housing of the adapter of the present invention has at least one opening to receive at least one reel-drive spindle of the cassette playback deck, and a record head supported in the housing in a position for contacting the playback head normally provided in the playback deck. An electrical conductor, such as a dual lead conductor, is coupled at one end to a plug that is compatible with the usual headphone jack of the other sound producing device and is connected at its other end through an audio circuit to the record head. When the adapter is loaded into the cassette playback deck and that deck as well as the other device both are operated, signals produced by the other device are coupled, by means of the aforementioned conductor and audio circuit, to the record head from which those signals are applied to the playback head of the cassette playback deck and, thence, those signals are reproduced by the audio system.

Preferably, the aforementioned electrical conductor passes into the housing through an opening in the peripheral wall thereof, which opening is positioned such that the conductor does not interfere with the internal mechanism of a front-loading or side-loading playback deck. In one embodiment this opening is at a rear corner of the adapter housing. This rear corner is formed by the intersection of a side wall section of the peripheral wall and the rear wall section thereof, the rear wall section being opposite the front wall section at which the record head is located. Since most cassettes are loaded into automobile cassette players in a manner such that this rear corner is accessible through the conventional cassette player entry slot, there is no impediment to the aforementioned electrical conductor which emerges from that entry slot for connection to the other sound producing device. In another embodiment, the opening in the peripheral wall comprises a slot that runs the length of the rear wall section and that extends partially along one or the other, or both, side wall sections.

BRIEF DESCRIPTION OF THE DRAWINGS

The following detailed description, given by way of example and not intended to limit the present invention solely to the illustrated embodiment, will best be understood in conjunction with the accompanying drawings in which:

FIGS. 7A and 7B are perspective views of another embodiment of the adapter of the present invention; and FIG. 8 is a representation of a mechanism included within the adapter to permit the use of the adapter with a cassette player having an automatic shut-off or reversal mechanism.

DETAILED DESCRIPTION OF A PREFERRED EMBODIMENT

Figure 1:
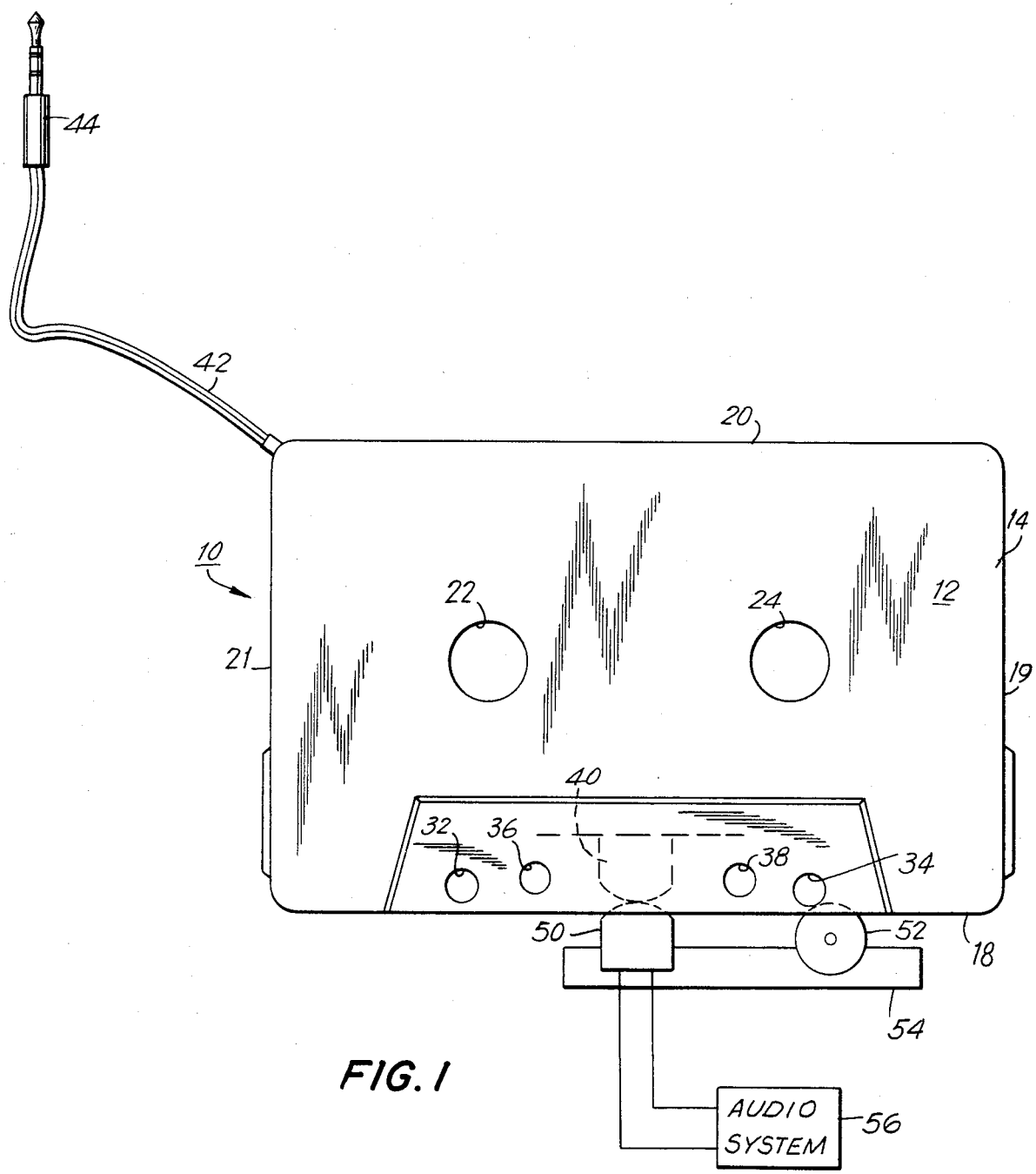
FIG. 1 is a top view of the adapter of the present invention and additionally shows schematically the manner in which this adapter may be used with a conventional cassette playback deck.

Referring now to the drawings, wherein like reference numerals are used throughout, adapter 10 is seen to be comprised of a housing 12 formed of a top wall 14, a bottom wall 16, a front wall 18, a rear wall 20, right side wall 19 and left side wall 21, respectively. The rear wall, right side wall and left side wall may be thought of as the rear wall section, and the right and left side wall sections, respectively, of a peripheral wall. In the preferred embodiment, adapter 10 is intended for use with a cassette deck player and, thus, housing 12 is illustrated in the familiar configuration of a conventional Philips-type (or standard) reel-to-reel cassette. It will be appreciated that, depending upon the particular playback deck with which adapter 10 is to be used, housing 12 will assume a configuration compatible therewith. It is contemplated, therefore, that housing 12 may be shaped in the configuration of a conventional eight-track cartridge, a microcassette, or other cassette or cartridge commercially available to play back previously recorded audio signals from a magnetic tape.

In its preferred embodiment, housing 12 is provided with a pair of openings 22 and 24 which extend through top and bottom walls 14 and 16, respectively, as illustrated. Openings 22 and 24 are adapted to receive the conventional reel-drive spindles provided in the usual cassette playback deck when adapter 10 is loaded into that deck. Of course, if the playback deck with which adapter 10 is used is provided with only a single reel-drive spindle, as in an eight-track cartridge player, only a single one of openings 22 and 24 need be provided.

The top and bottom walls of housing 12 also are provided with apertures 32, 34, 36 and 38, as illustrated in FIG. 1, these apertures being substantially the same as similar apertures provided in conventional cassettes. It is appreciated that aperture 32 or aperture 34 is adapted to receive the usual capstan that normally is provided in a cassette playback deck for the purpose of driving tape housed within that cassette past the usual playback head of the deck. In some cassette playback decks having bidirectional tape drive capabilities, two capstans are provided; and apertures 32 and 34 are adapted to receive each of those capstans. Apertures 36 and 38 are adapted to receive guide pins which, in many instances, are provided on cassette playback decks for the purpose of suitably positioning the cassette when loaded therein.

Figure 2:
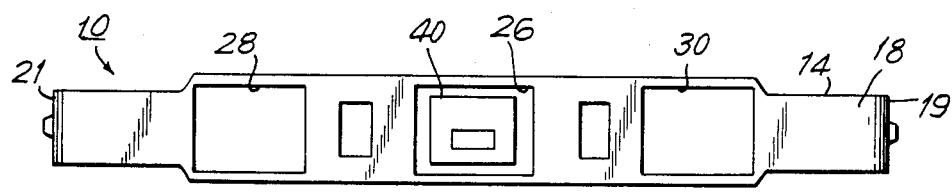
FIG. 2 is a front view of the adapter shown in FIG. 1.

Front wall 18 of housing 12 is provided with openings 26, 28 and 30 therein, as best seen in FIG. 2. In a conventional magnetic tape cassette, opening 26 is adapted to receive the playback head (or record-/playback head) of the usual cassette deck, whereby this head contacts the magnetic tape within the cassette to reproduce (or record) signals thereon. In adapter 10, a record head 40 is supported within housing 12 and positioned in opening 26 such that head 40 contacts the aforementioned playback head in the cassette playback deck with which adapter 10 is used. Record head 40 preferably is a stereophonic record head capable of recording two channels (e.g. left and right channels) of audio signals. Preferably, record head 40 is compatible with conventional record heads normally used in cassette playback decks having "auto-reverse" capability. Thus, for use in an auto-reverse playback deck having a dual playback head for operating in the auto-reverse mode, record head 40 comprises a dual playback head compatible therewith. Head 40 may be supported in the vicinity of opening 26 within housing 12 in any suitable manner. The particular means by which head 40 is so supported forms no part of the present invention per se. As will be described below, when audio signals are supplied to record head 40, they are transferred thereby to the usual playback head provided in the cassette playback deck with which adapter 10 is used. Insofar as the audio system with which the playback deck is provided is concerned, these transferred signals are processed as if they had been reproduced, or picked up, from a cassette tape.

Openings 28 and 30 in front wall 18 are adapted to receive and accommodate the usual pinch roller normally provided in a cassette playback deck. As is conventional, only one or the other of these openings will receive the pinch roller, depending upon whether the deck is operated for forward or reverse movement (e.g. to accommodate the "auto-reverse" feature of some decks). Also, the particular opening into which the pinch roller is inserted is dependent upon whether the adapter is loaded into the playback deck in a "top side up" or "top side down" manner.

Figure 3:
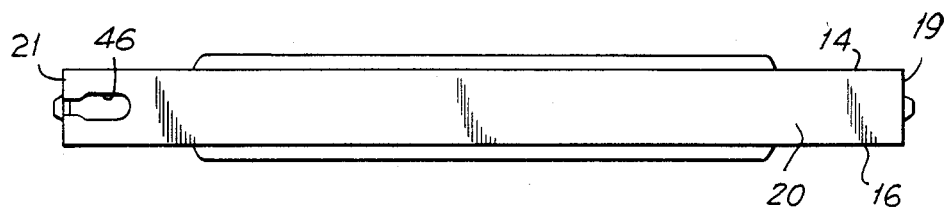
FIG. 3 is a rear view of the adapter shown in FIG. 1.
Figure 4:
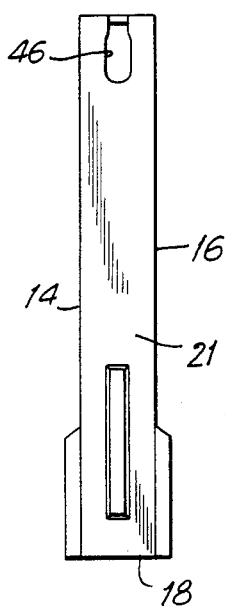
FIG. 4 is a left side view of the adapter shown in FIG. 1.
Figure 5:
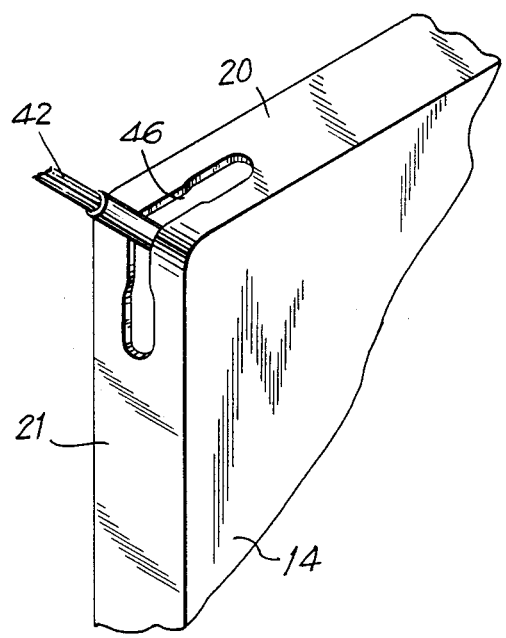
FIG. 5 is a perspective view of a rear corner of the adapter shown in FIG. 1.

The left rear corner of housing 12, as viewed in FIG. 1, is provided with a slot 46. This slot is shown in FIGS. 3 and 4 and is shown in greater detail in FIG. 5. It is appreciated that slot 46 extends partially along rear wall section 20 and also partially along left side wall section 21 of the peripheral wall. The purpose of slot 46 is to permit an electrical conductor 42, such as a dual wire cable, or the like, to pass therethrough into housing 12 for connection to an audio circuit within the housing (described below). Electrical conductor 42 is, of course, flexible and unrestrained so as to be movable in slot 46. Preferably, the slot is provided with a radius at its opposite ends to releasably secure electrical conductor 42 when that conductor is moved to one end or the other of the slot.

Electrical conductor 42, which may comprise two insulated wires, is connected at one end thereof to the aforementioned audio circuit, and is provided at its opposite end with a plug 44. This plug is a conventional stereophonic "mini-plug" of a type readily available from various manufacturers. Plug 44 is adapted to be received by a jack of a playback device which utilizes a medium that is not receivable by the cassette playback deck. As one example, this playback device may be a conventional compact disc player, preferably, a portable compact disc player. It should be appreciated that plug 44 may be connected to any other playback device of any desirable format. Plug 44 thus serves to supply to electrical conductor 42 the audio signals which are reproduced by that playback device. Conductor 42, in turn, applies these played back audio signals to record head 40 via the audio circuit shown in FIG. 6.

Figure 6:
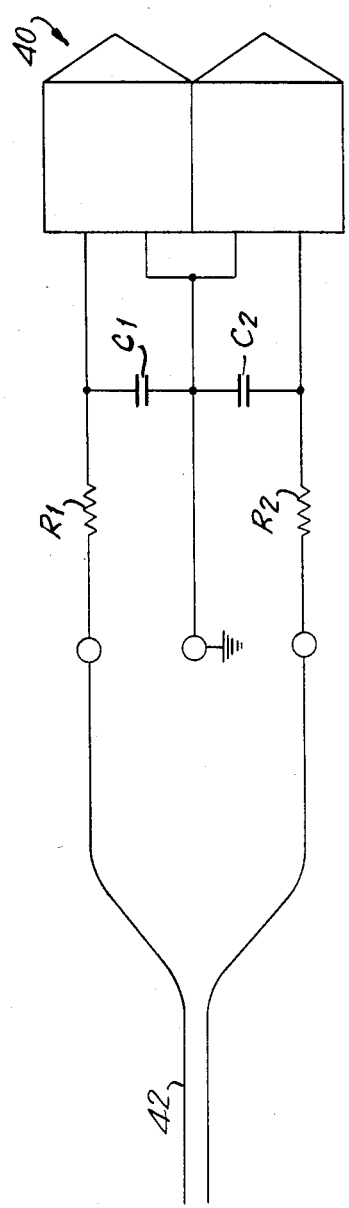
FIG. 6 is a schematic diagram of the electrical circuitry used in the adapter shown in FIG. 1.

Turning to FIG. 6, electrical conductor 42 is illustrated as comprising two separate electrical wires, each wire serving to transmit a respective channel of audio signals. In the contemplated utilization of adapter 10, it is anticipated that the compact disc player (or other playback device) with which the adapter is used produces stereophonic left-channel and right-channel audio signals. As is conventional, the left-channel audio signals are conducted via one wire and the right-channel audio signals are conducted via the other. The audio circuit to which electrical conductor 42 is connected is comprised of separate left-channel and right-channel frequency response compensation circuits. Each compensation circuit is comprised of an RC circuit, as illustrated, with the frequency response compensation circuit comprised of resistor $R_1$ and capacitor $C_1$ being connected to one wire and the frequency response compensation circuit comprised of resistor $R_2$ and capacitor $C_2$ being connected to the other wire. Capacitors $C_1$ and $C_2$ are connected in common to a reference potential, such as ground. The junction defined by resistor $R_1$ and capacitor $C_1$ is connected to one terminal of record head 40; and the junction defined by resistor $R_2$ and capacitor $C_2$ is connected to another terminal of head 40. It is appreciated that the record head comprises a conventional stereophonic record head to which separate left-channel and right-channel audio signals are applied and recorded in separate tracks. In most cassette playback decks with which adapter 10 is to be used, the playback head therein is a similar stereophonic playback head with which head 40 is compatible. Thus, the separate left-channel and right-channel audio signals that are applied to record head 40 are, in turn, picked up by the playback head of the cassette playback deck with which adapter 10 is used. Preferably, the housing normally provided as an integral portion of record head 40 is grounded, and this housing contacts the housing of the playback head of the cassette playback deck to establish a common ground between the deck and adapter 10.

In operation, plug 44 is connected to the usual headphone jack of the compact disc player (or other device) whose output is intended to be utilized by the audio system having a cassette playback deck (e. g. an automobile sound system). Adapter 10 then is loaded into the cassette playback deck. Typically, and as found in most cassette playback decks incorporated into automobile sound systems, such decks are either "front loading" or "side loading" decks. A "front loading" deck is one in which front wall 18 of adapter 10 is inserted first into an entry slot of the deck. A "side loading" cassette playback deck is one in which side wall 19 of the adapter is inserted first into the entry slot. It will be appreciated that, when loading adapter 10 into a "front loading" deck, electrical conductor 42 is moved through slot 46 so as to pass through the radius thereof formed in rear wall section 20. When the adapter is loaded into a "side loading" deck, conductor 42 is moved through slot 46 so as to be disposed at the radius located in left side wall section 21. It is appreciated, therefore, that slot 46 and the movement of electrical conductor 42 therein permits adapter 10 to be used with either "front loading" or "side loading" decks without interference between conductor 42 and the entry slot of that deck. In the event that the entry slot is provided with a door, there still is no interference between conductor 42 and that door.

Once adapter 10 is loaded onto the cassette playback deck, as aforementioned, the deck is operated such that the usual head support structure, such as member 54 shown in FIG. 1, moves forward to bring playback head 50 of that deck into contact with record head 40. It is expected that pinch roller 52, also mounted on member 54, will be moved into opening 30 (FIG. 2) in the same manner as if adapter 10 had been a conventional tape cassette. Then, when the compact disc player (not shown) is operated, signals played back by that player are applied to electrical conductor 42 by plug 44, these signals being frequency compensated by the audio circuit shown in FIG. 6 and applied, as separate left-channel and right-channel audio signals, to stereo record head 40. Then, these signals are transferred from head 40 to playback head 50 of the cassette playback deck, from which these signals then are processed by the usual audio system 56 normally connected to the cassette playback deck. In this manner, the audio signals which had been produced by the compact disc player are transferred, by means of adapter 10, to the conventional audio sound system 56, of which the cassette playback deck is an integral component, and the resultant audio sounds are reproduced by that system.

Consequently, presently existing sound systems conventionally found in automobiles may be used with a compact disc player, such as a portable compact disc player, to reproduce sounds from that player without requiring any electrical or structural modification to the existing sound system. Furthermore, that sound system still may be used to reproduce sounds from conventional tape cassettes which, it is appreciated, may be substituted for adapter 10 for use in the cassette playback deck.

Housing 12 may be formed of suitable plastic materials and may be hollow to contain the audio circuit shown in FIG. 6. Alternatively, the housing may be epoxy-filled, if desired. Preferably, head 40 is supported in housing 12 in a manner such that forward and rearward movement of the head is permitted but lateral, or left-right, movement thereof is prevented. Suitable mounting means may be utilized to achieve this objective. The forward-rearward movement of head 40 accommodates different positions and similar forward-rearward movements of playback head 50 of the cassette playback deck.

The gap, or gaps, provided in head 40 are positioned so as to be in alignment with similar gap, or gaps, of playback head 50.

Another embodiment of the present invention is illustrated in the perspective views shown in FIGS. 7A and 7B. This embodiment differs from that described hereinabove in respect of the configuration of slot 46. In the presently described embodiment, slot 46 extends from one corner of the peripheral wall of adapter 10 to the other corner thereof. As particularly shown in FIGS. 7A and 7B, this slot runs the length of rear wall section 20 and extends partially along side wall section 19 as well as partially along side wall section 21. The drawings clearly illustrate that slot 46 has radii at both of its ends, these radii being disposed in the left and right side wall sections of the peripheral wall, and each radius having a dimension that is greater than the width of slot 46 within rear wall section 20. Thus, electrical conductor 42 may slide through slot 46 along the entire length of the slot and may be positioned at any location within rear wall section 20 of adapter 10. Furthermore, electrical conductor 42 may be moved into that portion of slot 46 which extends partially along either of the side wall sections of adapter 10; and when positioned in such portion of slot 46 the electrical conductor is releasably captured either in the radius in left side wall section 21 or in the radius in right side wall section 19. It is appreciated, therefore, that when conductor 42 is disposed in either of the end radii of slot 46, or in that portion of the slot which extends partially along either side wall section of the peripheral wall of adapter 10, the adapter may be used with a side-loading cassette playback deck. By extending the slot partially along both of the side wall sections, adapter 10 may be used with both left side-loading and right-loading decks without interference between conductor 42 and the entry slots of those decks.

As also illustrated, slot 46, although running the entire length of rear wall section 20, is provided with radii along intermediate portions thereof in the vicinity of the left and right corners of the peripheral wall. Such additional radii are located at each corner similar to the radius shown in rear wall section 20 in FIG. 5. Such additional radii thus may capture conductor 42 in the vicinity of the right corner or the left corner of the peripheral wall while, nevertheless, the conductor emerges from rear wall section 20. Hence, adapter 10 may be used with a front-loading cassette playback deck.

It is seen that the embodiments shown particularly in FIGS. 1-7 are readily adapted for use in cassette playback decks which may be either of the front-loading type or the side-loading type. In both embodiments, electrical conductor 42 passes through the peripheral wall of adapter 10 substantially free of interference with the operating components of the playback deck with which the adapter is used.

Still another embodiment of the present invention is illustrated in FIG. 8. This embodiment is intended to account for automatic shut-off sensing devices that may be included in the cassette playback deck with which adapter 10 is used, and also automatic reversing devices, referred to previously as "auto-reverse" decks, in which the end of the cassette tape is sensed by detecting a stationary reel-drive spindle during a playback mode. For example, if tape is transported from the left reel of a conventional cassette to the right reel thereof, the tape transport mechanism may be stopped or reversed (for reverse movement of the tape) when rotary movement of the left reel drive spindle no longer is sensed. Conversely, if the tape is driven from the right reel to the left reel of the cassette, the shut-off or auto reverse mechanism of the cassette playback deck may be operated when rotary movement of the right reel drive spindle no longer is detected. Normally, when tape is driven in the left-to-right direction, the right reel drive spindle functions as the tape take-up drive spindle, and the left reel drive spindle merely idles. That is, the left reel drive spindle which functions as the supply reel drive spindle, rotates by reason of the tape paying out from the left reel. Conversely, when tape is driven in the right-to-left direction, the left reel drive spindle functions as the tape take-up reel drive spindle and the right reel drive spindle merely idles and functions as the tape supply reel drive spindle. In the embodiment shown in FIGS. 1-7, both the left and right reel drive spindles of the cassette playback deck simply pass through openings 22 and 24 of adapter 10; and only one of these reel drive spindles will be driven. In the absence of any tape pay out, the other reel drive spindle is not rotated. Hence, the aforementioned tape shut-off or auto-reverse mechanism will be operated continually because the supply reel drive spindle will not be rotated.

The embodiment of FIG. 8 overcomes this continual triggering of the shut-off or auto-reverse mechanism. In this embodiment, rotatable reels 60 and 62 are provided in housing 12 of adapter 10, these reels being provided with hubs 68 and 70 with the usual teeth to receive the respective drive spindles of a cassette playback deck. In addition, reels 60 and 62 are provided with teeth 64 and 66 on the outer periphery thereof. An endless band 72 is deployed about reels 60 and 62, this endless band being provided with apertures that receive teeth 64 and 66. It will be appreciated that, when reel 60 is driven, the rotation thereof causes endless band 72 to be rotated and, as a result, the movement of endless band 72 rotatably drives reel 62. Conversely, if reel 62 is driven by a drive spindle of a cassette playback deck, endless band 72 is driven thereby and, as a result, reel 60 is rotatably driven.

From the foregoing, it is recognized that endless band 72 functions as a rotation transmission which mechanically links reel hubs 68 and 70. This mechanical interconnection transmits rotary drive motion from one reel hub to the other such that the driving of reel 60 causes reel 62 to rotate, and vice versa. Thus, by providing reels 60 and 62 with hubs 68 and 70 concentric with openings 22 and 24 in housing 12, the continual operation of the shut-off or auto-reverse mechanism that may be provided in the cassette playback deck with which adapter 10 is used is avoided.

It will be appreciated that, if desired, other mechanical interlinking, or rotation transmission, devices may be used to mechanically couple reels 60 and 62. For example, rotary gear transmissions, such as found in copending application Ser. No. 717,450, may be used in place of endless band 72. As another alternative, endless band 72 may be provided as a friction drive band, or cable, and teeth 64 and 66 may be omitted from the peripheries of reels 60 and 62. In this alternative, the endless band functions as a friction drive mechanism to mechanically interlink the reel hubs. Still further, a simple tape may be wound about reels 60 and 62 for reel-to-reel movement.

While the present invention has been particularly shown and described with reference to a preferred embodiment, it will be readily appreciated by those of ordinary skill in the art that various changes and modifications may be made without departing from the spirit and scope of the invention. For example, housing 12 may assume the configuration of a standard, or Philips cassette, an eight-track cartridge, a microcassette or other tape-containing housing. Depending upon the particular configuration, suitable openings are provided through the housing to accommodate the drive spindles, capstans, pinch rollers, guide pins and other elements normally provided in the playback deck with which adapter 10 is intended to be used. While slot 46 advantageously permits electrical conductor 42 to be moved so as to be free of interference when adapter 10 is used with "front loading" or "side loading" decks, this slot may be provided only in rear wall section 20 or only in side wall section 21 if adapter 10 is to be limited for use only with a "front loading" or a "side loading" deck, respectively. Also, the intermediate radii of slot 46, as shown in FIGS. 7A and 7B, may be omitted. Other obvious modifications may be made to housing 12 for the purpose of receiving electrical conductor 42 in the event that adapter 10 is used with a "rear loading" cassette playback deck.

It is intended that the appended claims be interpreted as including the foregoing as well as other equivalent changes and modifications.

What is claimed is:

1. An adapter for enabling the signals produced by a device of the type having a headphone jack to be reproduced as audio sounds by a cassette player audio system of the type having a cassette playback deck in systems of the front-loading and side-loading types wherein said cassette is normally disposed and positioned in use substantially completely within the confines of said cassette playback deck and wherein said playback decks include a pair of spaced reel-drive spindles and a playback head, said adapter comprising: a housing of a configuration of a cassette normally used with said playback deck, said housing having at least a pair of openings to receive said pair of reel-drive spindles associated with said playback deck; a record head supported in said housing in a position for contacting the playback head of said playback deck when said adapter is received in said playback deck; audio circuit means within said housing and electrically connected to said record head for providing audio signals to said record head; electrical conducting means having one end coupled to said audio circuit means within said adapter and extending form said adapter, said electrical conducting means being coupled at its other end to a plug compatible with the headphone jack of said device; said electrical conducting means being movable between a first position such that said adapter may be used with a playback deck of the front-loading type and a second position such that said adapter may be used with a play back deck of the side-loading type so that said electrical conducting means when said adapter is positioned in such playback deck passes out of said playback deck free of interference with said playback deck; whereby when said adapter is received by said playback deck and said plug is connected to said headphone jack, the signals produced by said device are applied to said record head and applied thereby to said playback head and thence reproduced by said audio system.

2. The adapter of claim 1 wherein said electrical conducting means extends from said adapter from an opening in a peripheral wall of said adapter.

3. The adapter of claim 2 wherein said housing has top and bottom walls and said pair of openings extend through said top and bottom walls, first and second reel hubs substantailly concentric within said openings, respectively, and interconnecting means for interconnecting said first and second reel hubs such that when a reel hub is driven by a reel-drive spindle the other reel hub is driven by said interconnecting means.

4. The adapter of claim 2 wherein said opening in said peripheral wall is positioned at a corner.

5. The adapter of claim 2 wherein said opening in said peripheral wall extends from one corner thereof to another corner thereof.

6. The adapter of claim 2 wherein said cassette playback deck may be of the auto-reverse type having a dual playback head for operating in an auto-reverse mode; and wherein said record head in said adapter comprises a dual record head compatible with said dual playback head.

7. An adapter for enabling the signals produced by a device of the type having a headphone jack to be reproduced as audio sounds by a cassette player audio system of the type having a cassette palyback deck which may be of the front-loading or side-loading type and which includes at least one reel-drive spindle and a playback head, said adapter comprising: a housing of a configuration of a cassette normally used with said playback deck, said housing having at least one opening to receive said at least one reel-drive spindle and a peripheral wall having an opening therein; a record head supported in said housing in a position for contacting the playback head of said playback deck when said adapter is received in said playback deck; audio circuit means within said housing and electrically connected to said record head for providing audio signals to said record head; electrical conducting means passing through said opening in said peripheral wall and having one end coupled to said audio circuit means and another end couple to a plug compatible with the headphone jack of said device; wherein said peripheral wall has a rear wall section and two side wall sections, and said opening in said peripheral wall comprises a slot located at the corner of said rear wall section and one of said side wall sections and extending partially along each, said slot having radii at both of its ends, each radius having a dimension greater than the width of the slot, such that said electrical conducting means is releasably secured in either radius and passes through the slot free of interference with and merges from said playback deck even if said playback deck is of the front-loading or side-loading type; whereby when said adapter is received by said playback deck and said plug is connected to said headphone jack, the signals produced by said device are applied to said record head and applied thereby to said playback head and thence reproduced by said audio system.

8. The adapter of claim 7 wherein said electrical conducting means comprises a pair of insulated wires movable to pass substantially only through that portion of the slot which extends along said rear wall or to pass substantially only through that portion of the slot which extends along said one side wall.

9. An adapter for enabling the signals produced by a device of the type having a headphone jack to be reproduced as audio sounds by a cassette player audio system of the type having a cassette playback deck which may be of the front-loading or side-loading type and which includes at least one reel-drive spindle and a playback head, said adapter comprising: a housing of a configuration of a cassette normally used with said playback deck, said housing having at least one opening to receive said at least one reel-drive spindle and a peripheral wall having an opening therein; a record head supported in said housing in a position for contacting the playback head of said playback deck when said adapter is received in said playback deck; audio circuit means within said housing and electrically connected to said record head for providing audio signals to said record head; electrical conducting means passing through said opening in said peripheral wall and having one end coupled to said audio circuit means and another end coupled to a plug compatible with the headphone jack of said device; wherein said peripheral wall has a rear wall section and two side wall sections, and said opening in said peripheral wall comprises a slot running the length of said rear wall section and extending partially along each side wall section, said slot having radii at both of its ends, each radius having a dimension greater than the width of the slot to releasably capture said electrical conducting means such that the electrical conducting means which passes through the slot is free of interference with and emerges from said playback deck even if said playback deck is of the front-loading or side-loading type; whereby when said adapter is received by said playback deck and said plug is connected to said headphone jack, the signals produced by said device are applied to said record head and applied thereby to said playback head and thence reproduced by said audio system.

10. An adapter for enabling the signals produced by a device of the type having a headphone jack to be reproduced as audio sounds by a cassette player audio system of the type having a cassette playback deck which may be of the front-loading or side-loading type and which includes at least one reel-drive spindle and a playback head, said adapter comprising: a housing of a configuration of a cassette normally used with said playback deck, said housing having top and bottom walls, first and second openings which extend through said top and bottom walls, first and second reel hubs substantially concentric with said first and second openings, respectively, and interconnecting means for interconnecting said first and second reel hubs such that when said first reel hub is driven by said one reel-drive spindle said second reel hub is driven by said interconnecting means; a record head supported in said housing in a position for contacting the playback head of said playback deck when said adapter is received in said playback deck; audio circuit means within said housing and electrically connected to said record head for providing audio signals to said record head; electrical conducting means passing through said opening in said peripheral wall and having one end coupled to said audio circuit means and another end coupled to a plug compatible with the headphone jack of said device; and wherein said opening in said peripheral wall is positioned such that the electrical conducting means which passes through is free of interference with and emerges from said plackback deck even if said playback deck is of the front-loading or side-loading type; whereby when said adpater is received by said playback deck and said plug is connected to said headphone jack, the signals produced by said device are applied to said record head and applied thereby to said playback head and thence reproduced by said audio system.

11. The adapter of claim 10 wherein said interconnecting means comprises an endless band disposed within said housing and deployed about said first and second reel hubs.

12. An adapter for enabling the signals produced by a device of the type having a headphone jack to be reproduced as audio sounds by a cassette palyer audio system of the type having a cassette playback deck including at least one reel-drive spindle and a playback head, said adapter comprising a housing of a configuration substantially identical to the configuration of a cassette normally used with said playback deck, said housing having at least one opening to receive said at least one reel-drive spindle and said housing having a rear wall and two side walls, a slot located at the corner of said rear wall and one of said side walls and extending along said rear wall and partially along said one side wall and having a radius at its opposite ends, each said radius having a dimension larger than the width of said slot; a record head supported in said housing in a position for contacting the playback head of said playback deck when said adapter is received in said playback deck; audio circuit means within said housing and electrically connected to said record head for providing audio signals to said record head; and electrical conducting means passing through said slot and releasably secured in either of said radii, said electrical conducting means being coupled at one end thereof to said audio circuit means and at the other end thereof to a plug compatible with the headphone jack of said device; whereby when said adapter is received by said playback deck and said plug is connected to said headphone jack, and said device and said playback deck both are operating, the signals produced by said device are applied to said record head from which they are applied to said playback head and thence reproduced by said audio system.

13. The adapter of claim 12 wherein said housing has top and bottom walls and said at least one opening extends through said top and bottom walls; and said housing has a front wall containing at least one front opening in which said record head is supported.

14. The adapter of claim 12 wherein said electrical conducting means comprises a pair of insulated wires movable to pass substantially only through that portion of the slot which extends along said rear wall or to pass substantially only through that portion of the slot which extends along said one side wall.

15. The adapter of claim 12 wherein the playback deck with which said adapter is used includes another reel-drive spindle, a capstan and a pinch roller; and said housing has another opening which extends through said top and bottom walls to receive said other reel-drive spindle, a further opening which extends through said top and bottom walls to receive said capstan, and another front opening in said front wall to receive said pinch roller when said adapter is received in said playback deck.

16. The adapter of claim 15 further comprising first and second reel members disposed in said housing and having hubs concentric with respective openings in said top and bottom walls to receive the reel-drive spindles of said playback deck; and rotation transmission means linking said first and second reel members such that said second reel member is driven by said rotation transmission means when said first reel member is driven by a reel-drive spindle.

17. The adapter of claim 12 wherein said audio circuit means comprises a frequency response compensation circuit.

18. The adapter of claim 17 wherein said playback device is operable to produce two channels of audio signals, said electrical conducting means conducts said two channels of audio signals independently of each other, said plug applies said two channels of audio signals to said electrical conducting means, and said frequency response compensation circuit comprises two RC circuits, one for each channel.

19. The adapter of claim 18 wherein said record head comprises a two-channel record head, each channel being electrically connected to a respective RC circuit for receiving therefrom a frequency compensated audio signal.

* * * * *

UNITED STATES PATENT AND TRADEMARK OFFICE
CERTIFICATE OF CORRECTION

PATENT NO. : 4,734,897
DATED : Mar. 29, 1988
INVENTOR(S) : Larry Schotz

It is certified that error appears in the above-identified patent and that said Letters Patent is hereby corrected as shown below:

Claim 1, column 9, line 57, "decks" should be -- deck --; "include" should be -- includes --;

column 10, line 2, "torm" should be -- from --;

line 9, "plav back" should be -- playback --.

Claim 7, column 10, line 44, "palyback" should be -- playback --;

column 11, line 2, "merges" should be -- emerges --.

Claim 10, column 12, line 12, "through" should be -- therethrough --;

line 14, "plack-" should be -- play- --

Signed and Sealed this

Twenty-sixth Day of July, 1988

Attest:

DONALD J. QUIGG

Attesting Officer      Commissioner of Patents and Trademarks

REEXAMINATION CERTIFICATE (1170th)
United States Patent [19]
Schotz

[11] B1 4,734,897
[45] Certificate Issued  Dec. 12, 1989

[54] CASSETTE ADAPTER FOR PLAYBACK DEVICE SUCH AS A COMPACT DISK PLAYER

[75] Inventor: Larry Schotz, Cedarburg, Wis.

[73] Assignee: Recoton Corporation

Reexamination Request:
No. 90/001,691, Jan. 17, 1989

Reexamination Certificate for:
Patent No.: 4,734,897
Issued: Mar. 29, 1988
Appl. No.: 890,355
Filed: Jul. 25, 1986

Related U.S. Application Data

[63] Continuation-in-part of Ser. No. 797,706, Nov. 13, 1985, abandoned.

[51] Int. Cl.⁴ .............................................. H04B 1/20
[52] U.S. Cl. ....................................... 369/2; 369/289; 360/137; 381/86; 174/65 R
[58] Field of Search ...................... 369/2, 289, 1, 5, 9, 369/10, 11, 12; 360/137, 110; 174/65 R, 154; 381/86; 439/459, 461, 466

[56] References Cited
U.S. PATENT DOCUMENTS

| 3,483,309 | 12/1969 | Kerseg et al. | 174/65 R |
| 4,388,660 | 6/1983 | Osanai | 360/110 |
| 4,421,376 | 12/1983 | Cosmos et al. | 439/461 |

Primary Examiner—Aristotelis M. Psitos

[57] ABSTRACT

An adapter for enabling the signals produced by one type of playback device, such as a compact disc player, to be reproduced as audio sounds by a cassette player audio system, the latter having a conventional cassette playback deck. The adapter is comprised of a housing having a configuration substantially identical to the configuration of a cassette normally used with the playback deck. The adapter housing has at least one opening to receive the usual reel-drive spindle of the playback deck; and a record head is supported in the housing in a position for contacting the usual playback head of the deck when the adapter is received, or loaded into that deck. The adapter is connected to the playback device (e.g. the compact disc player) by a plug connected to the usual headphone jack of the player, whereby signals produced by the player are supplied to the record head from which they are coupled to the playback head of the cassette deck for reproduction by the audio system.

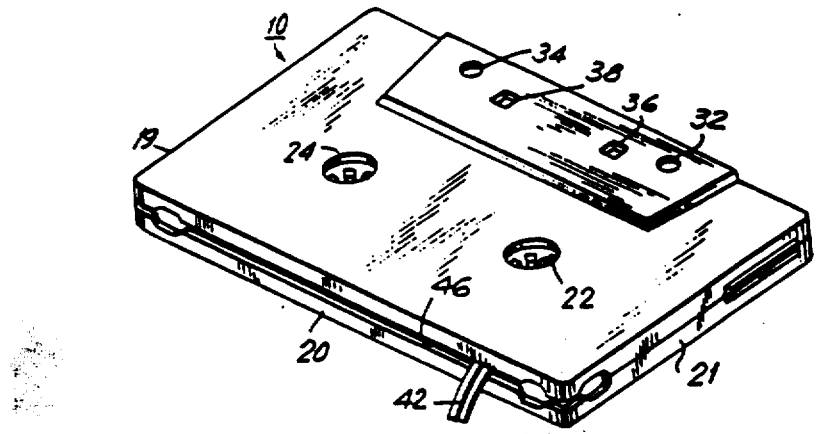

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7-19 is confirmed.

Claim 6 is cancelled.

Claims 1 and 5 are determined to be patentable as amended.

Claims 2-4, dependent on an amended claim, are determined to be patentable.

New claims 20-24 are added and determined to be patentable.

1. An adapter for enabling the signals produced by a device of the type having a headphone jack to be reproduced as audio sounds by a cassette player audio system of the type having a cassette playback deck in systems of the front-loading and side-loading types wherein said cassette is normally disposed and positioned in use substantially completely within the confines of said cassette playback deck and wherein said playback decks include a pair of spaced reel-drive spindles and a playback head, said adapter comprising: a housing of a configuration of a cassette normally used with said playback deck, said housing having at least a pair of openings to receive said pair of reel-drive spindles associated with said playback deck; a record head supported in said housing in a position for contacting the playback head of said playback deck when said adapter is received in said playback deck; audio circuit means within said housing and electrically connected to said record head for providing audio signals to said record head; electrical conducting means having one end coupled to said audio circuit means within said adapter and extending [form] *from* said adapter, said electrical conducting means being coupled at its other end to a plug compatible with the headphone jack *of said* device; said electrical conducting means being movable *after final assembly of said adapter for consumer use* between a first position such that said adapter may be used with a playback deck of the front-loading type and a second position such that said adapter may be used with a play back deck of the side-loading type so that said electrical conducting means when said adapter is positioned in such playback deck passes out of said playback deck free of interference with said playback deck; whereby when said adapter is received by said playback deck and said plug is connected to said headphone jack, the signals produced by said device are applied to said record head and applied thereby to said playback head and thence reproduced by said audio system.

5. [The adapter of claim 2 wherein] *An adapter for enabling the signals produced by a device of the type having a headphone jack to be reproduced as audio sounds by a cassette player audio system of the type having a cassette playback deck in systems of the front-loading and side-loading types wherein said cassette is normally disposed and positioned in use substantially completely within the confines of said cassette playback deck and wherein said playback decks include a pair of spaced reel-drive spindles associated with said playback deck; a record head supported in said housing in a position for contacting the playback head of said playback deck when said adapter is received in said playback deck; audio circuit means within said housing and electrically connected to said record head for providing audio signals to said record head; electrical conducting means having one end coupled to said audio circuit means within said adapter and extending from said adapter, said electrical conducting means extends from said adapter from an opening in a peripheral wall of said adapter; said opening in said peripheral wall continuously extends from one corner [thereof] of said peripheral wall to another corner thereof; said electrical conducting means being coupled at its other end to a plug compatible with the headphone jack of said device; said electrical conducting means being movable between a first position such that said adapter may be used with a playback deck of the front-loading type and a second position such that said adapter may be used with a playback deck of the side-loading type so that said electrical conducting means when said adapter is positioned in such playback deck passes out of said playback deck free of interference with said playback deck; whereby when said adapter is received by said playback deck and said plug is connected to said headphone jack, the signals produced by said device are applied to said record head and applied thereby to said playback head and thence reproduced by said audio system.*

*20. An adapter as claimed in claim 1 wherein said audio circuit means comprises a frequency response compensation circuit.*

*21. An adapter as claimed in claim 1 wherein said audio circuit means comprises a compensation circuit comprising resistance means.*

*22. An adapter as claimed in claim 1 wherein said plug and said electrical conducting means are mini-sized.*

*23. An adapter as claimed in claim 1 wherein the thickness of said electrical conducting means is less than the thickness of said housing.*

*24. The adapter of claim 1 wherein said cassette playback deck is of the auto-reverse type having a dual playback head for operating in an auto-reverse mode;*

*and wherein said record head in said adapter comprises a dual record head compatible with said dual playback head.*

* * * * *